United States Patent
Kaye

[15] 3,661,649
[45] May 9, 1972

[54] BATTERY PACKAGE
[72] Inventor: Gordon E. Kaye, South Salem, N.Y.
[73] Assignee: P. R. Mallory & Co., Inc., Indianapolis, Ind.
[22] Filed: Apr. 22, 1970
[21] Appl. No.: 30,743

[52] U.S. Cl. ............................136/132, 136/173, 229/44 R
[51] Int. Cl. .......................................................H01m 1/02
[58] Field of Search..................136/109, 132, 173, 170, 166; 229/16 B, 6, 44 R; 206/46 BA

[56] References Cited

UNITED STATES PATENTS

| 3,288,349 | 11/1966 | Palmer et al. | 229/16 B |
| 3,445,052 | 5/1969 | Lewallen | 229/16 B |
| 880,703 | 3/1908 | Wilhelm et al. | 136/132 |
| 3,356,277 | 12/1967 | Hohnjec | 229/44 R |
| 1,747,757 | 2/1930 | Deibel | 136/132 |

Primary Examiner—Donald L. Walton
Attorney—Robert Levine

[57] ABSTRACT

A battery package formed as a single plastic unit, with two side panels, each panel having pockets for accommodating a plurality of electro-chemical cells, and with a hingeing side edge panel joining the two side panels to permit folding the side panels toward each other, and means for holding them in a box structure, with integral end panels hinged at the ends of one side panel for folding to close the ends of the box, and means for holding the plastic box unit closed.

3 Claims, 5 Drawing Figures

Patented May 9, 1972
3,661,649
2 Sheets-Sheet 1
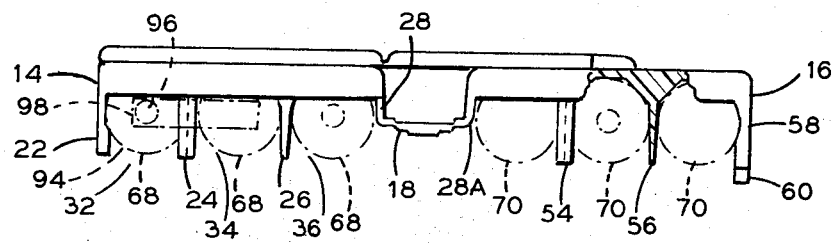
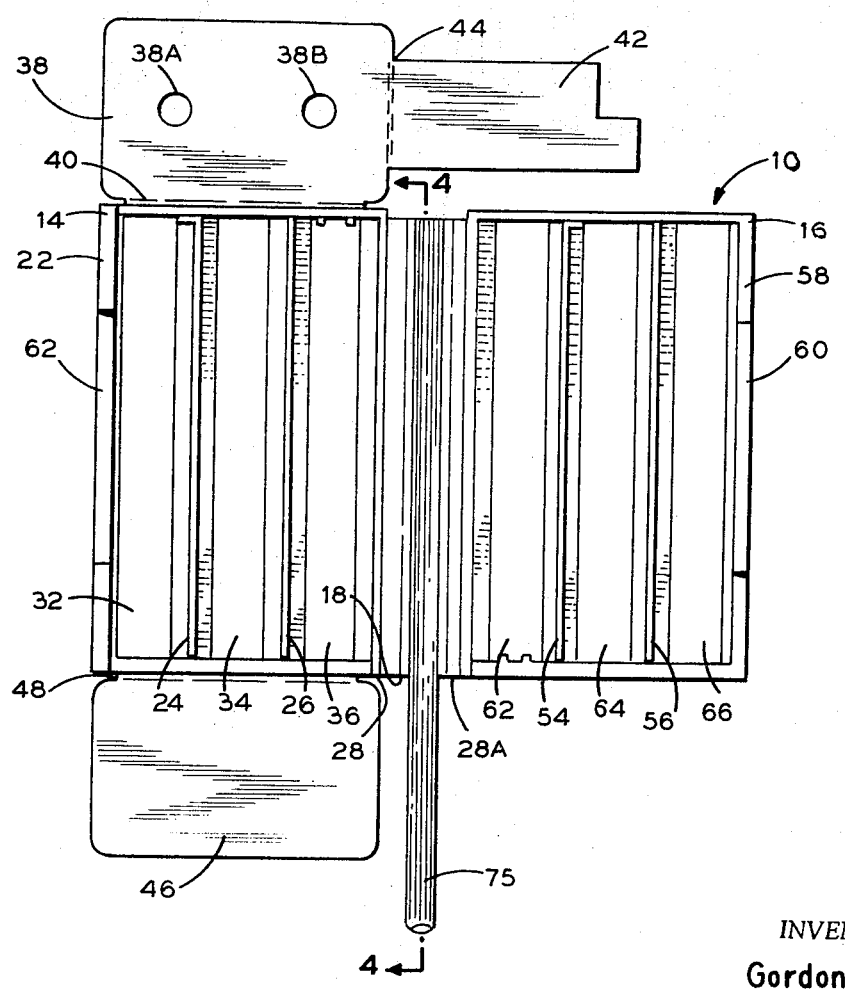
INVENTOR.
Gordon E. Kaye
BY
ATTORNEY Patented May 9, 1972

BATTERY PACKAGE

This invention relates to a battery package consisting of a specially formed housing to accommodate several small electro-chemical cells, generally of the type referred to as pencil batteries because of their relatively similar dimensions.

Because small batteries of the electro-chemical type are generally not rechargeable, but are rather throw-aways to be discarded after the full usefulness of the battery has been extracted, the cost of the battery and the economy of its manufacture become extremely important factors in the economics of battery manufacture and distribution.

Improvements are sought in a battery structural design that will provide a more economical structure permitting a simpler course of manufacture, or an improvement in design is sought that may lead to better functional operations or longer life of the electric cell, or an improvement may be sought in the packaging of the battery, where several cells are combined.

In conventional practice, the dimensions for cells utilized for various applications have been essentially standardized, whether by conventional agreement or by the sheer impact of the dimensions of a preferred commercial design. Thus, improvements may be sought and made in the packaging of the battery cells, to provide adequate and simplified packaging in the direction of greater economy in making the package and in the assembly of the cells in the package.

The type of design herein provides greater freedom of package design as well as a reduction in the number of overall parts, and assembly costs, in producing the battery package, than heretofore achieved. This is achieved herein by utilizing a single plastic press-out as a unit, provided with integrally joined elements that serve as sides and top and bottom closures to be formed into a housing or container for a plurality of cells.

In addition, the reduction of parts is achieved by the formation of a number of respective cavities, which at once insulate and isolate effectively each cell from the other, such as to avoid intercell short circuits from occurring within the package.

Also, the package acts as a manufacturing fixture, permitting automatic or manual interconnection between each cell, in a manner which reduces handling time in the locating and placement of parts.

In addition, the package permits any reasonable configuration of metallic contact terminal to be attached to the cell by means of automatic or manual assembly, and provides for a non-regular geometrical arrangement of said contact or contacts to be easily effected.

Intercell electrolyte leakage may be deterred from causing short circuits through leakage electrolyte paths by means of absorbent materials placed in the interstitial spaces of the structure near the cell seals. To achieve this, the package is made such that the compartments into which individual cells are placed, are split into two halves, in a manner that the parting line of the package is parallel to the center line, or near the center line of the plan view or side elevation of the unit cell. A unit cell thus snaps into the closely fitting compartment such that it will stay there during battery manufacturing operations. At least half of the cell end protrudes freely, allowing free access to the cell body for subsequent attachment of electrical interconnections.

The intercell connections may be placed on one terminal of each cell and this connector subsequently welded to the opposite terminal of the other cell, or these connections may be made on the cells after they are placed in the half case.

The external contacts are generally freed from restraint as to position or shape in like manner. It is only required that a projecting tab or terminal connector lead from said external contact be brought to fixed position with the required terminal of the cell through a slot in the case half. Said slot is contiguous with the parting line of the structure, and the tab simply slides into the slot without the need for piercing through a side wall. No further holding means are required, since the other half of the case traps and closes off, both cells, and terminal tabs. The tab, which was previously welded to the exposed cell terminal, is thoroughly captive after final closure of the two case halves.

In like manner any number of voltage taps may be made. The sealing of the two halves is accomplished by solvent bonding, or ultrasonic methods in the case of thermoplastic case materials. Self-adhering cases can be designed to snap together, making the final configuration as specified.

The complete battery package is thus finished upon final closure, with a minumum of parts and labor.

Color and nonemclature may be built into the molded and metallic contacts as required, at no additional labor or material costs.

This invention is thus further directed to an improved concept in packaging utility by utilizing a unitary mold body to serve as a receiving tray for receiving and accommodating a predetermined quantity of cells in the proper ultimate disposition to permit the assembly of the cells in a final arrangement in such manner as to reduce to a minimum the number of handling operations required to complete the package in its finality, to be able to serve as a battery, with all of the external dimensions kept within certain prescribed limits.

In a production of the package as a unitary molding within which the cells are to be disposed, in accordance with this invention, suitable folding tabs are provided for mounting electric terminals, for example, and for covering cell bodies and polarity surfaces of the cells in such a way as to provide adequate insulation by merely folding appropriate tabs that are integrally formed on the unitary molding, so that the package for fully and properly enclosing the cells is formed completely in the unitary molding, which may then be positioned to constitute a closed housing with a minimum resort to external tools or manual operations. A package thus constituted and closed is then held in closed formation by a suitable metallic shell or can that serves to maintain the inner insulating housing in proper closed position throughout the normal life of the battery.

The construction of a package in accordance with this invention is described in more detail in the following specification, taken in connection with the accompanying drawings, in which FIG. 1 is a plan view of the unitary molding which serves as a package or inner wrap for six pencil type cells;

FIG. 2 is a top view looking down on the molded plastic unit shown in FIG. 1;

Figure 3:
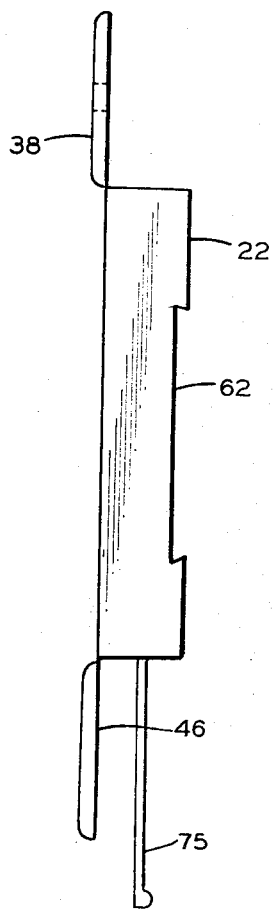
FIG. 3 is a left-hand side elevational view of the unitary molding in FIG. 1.
Figure 4:
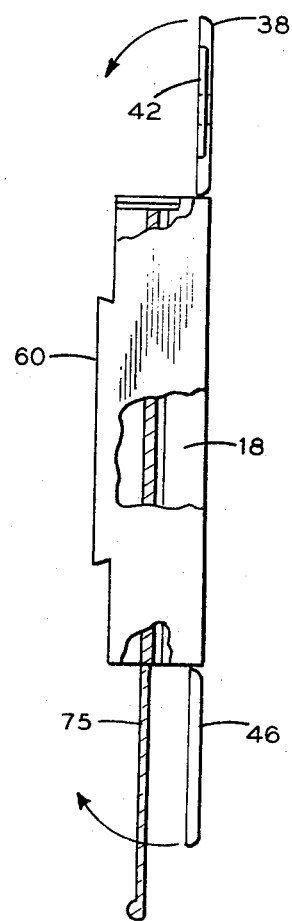
FIG. 4 is a right-hand side elevational end view, with portions broken away, of the unitary molding of FIG. 1.

As shown generally in the drawings, a molded plastic unit 10 in FIG. 1, of polypropylene, for example is formed as a single unit to embody several joined elements, including a back panel 14, and a front panel 16 coupled to the back panel 14 by a flexible side wall strip 18, running the full length of the back and front panels 14 and 16. The back panel 14 is provided with a half side end wall 22 and two partitions 24 and 26 that serve to divide the space between the side end wall 22 and a hingeing line element 28 (FIG. 2) of the flexible side wall strip 18 into three equal spaces or compartments 32, 34, and 36, of appropriate dimensions to receive respectively a single pencil type electro-chemical cell.

The top edge of the back panel 14 supports a top terminal panel 38 connected along its lower edge to the top edge of the back panel 14 by a thin hinge section 40. That top terminal panel 38 is provided with two holes 38A and 38B for receiving two battery terminals for connection to an external circuit. That terminal panel 38 also carries an insulating sub-panel 42 which is connected to terminal panel 38 by a hinge section 44 to enable the sub-panel or tab 42 to be folded under said top terminal panel 38 to serve as an insulating cover over the bottom portions of the terminals to be disposed in the holes 38A and 38B of said terminal panel 38.

The bottom edge of the back panel 14 similarly supports a bottom base panel 46 which is connected to the bottom edge of the back panel 14 along a thin hinge portion 48.

The front panel 16 is connected to the opposite edge 28A of the flexible side strip 18, which serves also as a hinge to enable the front panel 16 to be folded over to front covering position with respect to the back panel 14 of the molded unit 10.

The front panel 16 is similarly provided with two partitions 54 and 56, and an outer wall section 58 that embodies a tenon 60 to fit into a correspondingly shaped groove 62 on the other outer side wall edge 22 on back panel 14, when the molded unit is folded into closed position.

The front panel 16 is divided by the partitions 54 and 56 into three longitudinal chambers or spaces 62, 64 and 66 to receive three pencil type electro-chemical cells.

Thus, when the spaces in the front panel 16 and in the back panel 14 are filled, so the back panel 14 contains three cells 68 and the front panel 16 contains three cells 70, the front panel 16 may be folded over to close the molded unit with the several cells 68 and 70 enclosed therein. Each of the cells will be held confined in its own compartment, and the set of cells 70 in the front panel will be insulated and separated from cells 60 in the rear panel 14 by a suitable sheet of insulating paper or the equivalent.

The six cells thus contained in the small battery package may be connected in full series relationship or in parallel relationship to provide a voltage at the terminals corresponding to the series connected voltage of three cells in a parallel arrangement or to the series connected voltage of the six cells. Each of the cells used for this purpose is generally contained in a metallic can as one outer terminal of one polarity and is provided with an axial terminal at the other end of the can, suitably insulated from the corresponding rim edge of the can. The individual cells are interconnected in accordance with the parallel series or arrangement desired, and the appropriate end terminals are connected to the terminals mounted in the holes 38A and 38B in said terminal panel 38, and the insulating tab 42 is then folded over the bottom side of those terminals to provide top cover insulation for the upper ends of the cells.

The bottom ends of the cells are then also covered or insulated for protection against external short circuiting possibilities, by covering those bottom ends with an insulating folding strip 75 formed to normally depend from the flexible connecting side wall strip 18, and then to be folded upward against the lower ends of the cells, after which the insulating base panel 46 is folded upward around its hinge 48 to engage the folding strip 75, and the bottom edges of the front panel 16 and the side wall portions 22 and 58, and the bottom edge of the flexible side strip 18 that functions as a hinge between the back panel 14, and the front panel 16. During these folding operations the box structure is held closed by the tenon 60 in groove 62, as in FIG. 5.

Figure 5:
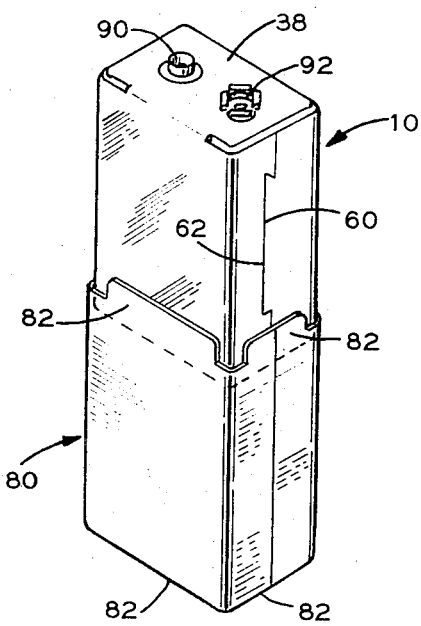
FIG. 5 is a perspective view of the molding as a box being inserted into its metal jacket.

In order now to keep the molded case permanently closed to protect the cells in the closed molded inner case 10, the closed case or housing 10 is encased in an outer metallic shell 80, shaped as a hollow cylinder of rectangular section, to permit the molded case 10 now closed, as in FIG. 5, to be readily slid into the metal shell 80, after which bendable extension tabs 82 at the top end of the metal shell 80 are pressed inwardly, radially, and co-planarly to engage the top terminal panel 38 around the peripheral edge of said panel 38, with sufficient spacing between the edges of those bendable metal tabs 82 to be spaced from, and, therefore, insulated from the terminals 90 and 92 in said top terminal panel 38.

Similarly the bottom edge of the outer metal shell 80 is provided with extension tabs 82 on all four sides, which are then peened over to engage the lower hinged base panel 46 in its closed position, in order to lock that closed panel 46 in such closing position and to thereby keep the inner case 10 closed to retain the cells against any displacement.

Thus, by means of the construction shown here of the insulating casing molded as a single unit to hold the six pencil type cells, with the several tabs and panels appropriately hinged to permit relative displacement of the panels for closing the molded unit as a single inner housing of the package, each of the front and back walls or panels of the molded unit may be utilized as a tray during manufacture, in which the cells may be easily and readily disposed for assembly, and to permit welding operation of inter-cellular connecting metal conducting tabs, with suitable tab elements formed as part of the unitary molded structure to serve to support those tabs without the use of external tools, whereby extra tooling and the necessary manual operations that would be involved are all obviated so that the operation of assembling the cells in the casing is simplified and expedited, and the cost of that operation reduced to a practical minimum, while retaining the features of simplicity in design and in the operating steps required in the manufacturing operation.

As will be observed in FIG. 2, more than half of the area of the cell can is exposed, so a can bottom or cathode area 94 is accessible, as well as a central anode top 96, so a short metal intercell connecting strip 98 can be welded to any cell and then to the next adjoining cell, with a small welding tool, while the cell is held in place in its compartment.

Modifications may be made in the construction details and in the arrangement of the related elements without departing from the spirit and scope of the invention as set forth in the appended claims.

What is claimed is:

1. A battery package for holding a plurality of electrochemical cells to serve as a battery source, comprising a molded unitary body having a plurality of molded panels unitarily formed and foldable about hinge lines to form and constitute a six-sided closed box structure, said body having generally two side panels and a connecting hinge-like panel between two said side panels to permit said two side panels to be moved to parallel oppositely facing positions as opposite box sides of a box like structure with top and bottom ends of said box open; means for then holding the outer edges of said two side panels together in said box-like position; each side panel is provided with partitions across the breadth of each panel into elongated compartments to respectively receive and separate and insulate inserted electro-chemical cells from each other; and means for closing the top and bottom ends of said box-like structure.

2. A battery package as in claim 1 in which each elongated compartment is provided with a stop end wall edge at each end of said compartment to retain the cell in the compartment from sliding out.

3. A battery package for holding a plurality of electrochemical cells to serve as a battery source, comprising a molded unitary body having a plurality of molded panels unitarily formed and foldable about hinge lines to form and constitute a six-sided closed box structure, said body having generally two side panels and a connecting hinge-like panel between two said side panels to permit said two side panels to be moved to parallel oppositely facing positions as opposite box sides of a box like structure with top and bottom ends of said box open; means for then holding the outer edges of said two side panels together in said box-like position; means for closing the top and bottom ends of said box-like structure, said means for closing the top and bottom ends of said box-like structure consist of individual flaps hingedly joined to the top and bottom edges, respectively of one side panel, by thin hinge-like sections integrally formed between said flaps and said edges of said side panel, said flap at said top edge of said side panel being provided with two holes in which two terminals for the battery may be disposed and an auxillary side edge flap is hingedly attached to one side edge of said top flap to permit said auxillary side edge flap to be folded under said top flap to cover the two terminals when disposed in said holes, to prevent these terminals from being undersirably engaged by portions of the cells in assembly in the molded housing.

* * * * *